United States Patent
Choi (10) Patent No.: US 11,285,902 B2
(45) Date of Patent: Mar. 29, 2022

(54) SEAT AIRBAG FOR VEHICLE

(71) Applicants: Hyundai Motor Company, Seoul (KR); Kia Motors Corporation, Seoul (KR)

(72) Inventor: Jae Ho Choi, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 91 days.

(21) Appl. No.: 16/571,942

(22) Filed: Sep. 16, 2019

(65) Prior Publication Data
US 2020/0317154 A1 Oct. 8, 2020

(30) Foreign Application Priority Data
Apr. 4, 2019 (KR) .......................... 10-2019-0039655

(51) Int. Cl.
*B60R 21/207* (2006.01)
*B60R 21/2338* (2011.01)

(52) U.S. Cl.
CPC ........ *B60R 21/207* (2013.01); *B60R 21/2338* (2013.01)

(58) Field of Classification Search
CPC . B60R 21/207; B60R 21/2338; B60R 21/013; B60R 2021/23384; B60R 21/231; B60R 2021/0004; B60R 2021/0009; B60W 30/14
See application file for complete search history.

(56) References Cited

U.S. PATENT DOCUMENTS

| | | |
|---|---|---|
| 9,744,932 B1 | 8/2017 | Faruque et al. |
| 2017/0225641 A1 | 8/2017 | Faruque et al. |
| 2017/0247006 A1 | 8/2017 | Rao et al. |
| 2017/0259772 A1 | 9/2017 | Farooq et al. |
| 2017/0259774 A1 | 9/2017 | Matsushita et al. |
| 2017/0291569 A1* | 10/2017 | Sugie .................. B60R 21/2338 |
| 2019/0031133 A1* | 1/2019 | Dry .................. B60R 21/23138 |
| 2019/0217803 A1* | 7/2019 | Dry .................. B60R 21/23138 |
| 2019/0217805 A1* | 7/2019 | Dry .......................... B60N 2/14 |
| 2020/0164828 A1* | 5/2020 | Park ...................... B60R 21/207 |
| 2020/0307488 A1* | 10/2020 | Kondrad ................ B60N 2/682 |
| 2021/0009074 A1* | 1/2021 | Wold .................. B60R 21/2342 |
| 2021/0039578 A1* | 2/2021 | Rupp .................... B60R 21/231 |

FOREIGN PATENT DOCUMENTS

EP    3 272 578 A1    1/2018

\* cited by examiner

*Primary Examiner* — Darlene P Condra
(74) *Attorney, Agent, or Firm* — Mintz Levin Cohn Ferris Glovsky and Popeo, P.C.; Peter F. Corless (57) ABSTRACT

A seat airbag for a vehicle includes: a cushion including: a main part provided along an edge of a seatback of a vehicle, the main part spreading to a front part of the seatback so as to cover a passenger when spreading and open on a front part of the main part while covering opposite side parts and an upper part of the passenger; and an extension part connected to an open front end of the main part and shrinking so as to protect a front part of the passenger; and a protection tether connected to the extension part and shrinking the extension part by pulling the extension part during spreading of the main part.

14 Claims, 6 Drawing Sheets

SEAT AIRBAG FOR VEHICLE

CROSS REFERENCE TO RELATED APPLICATION

The present application claims under 35 U.S.C. § 119(a) the benefit of Korean Patent Application No. 10-2019-0039655, filed Apr. 4, 2019, the entire contents of which are incorporated by reference herein.

BACKGROUND

(a) Technical Field

The present disclosure generally relates to a seat airbag for a vehicle, more particularly, to the seat airbag configured to be applied to an autonomous vehicle and to respond to various angles of a seat and various angles of collision, thereby efficiently protecting a passenger.

(b) Description of the Related Art

Recently, with the development of autonomous vehicles, it is expected that an interior space of an autonomous vehicle will be changed considerably as compared to an existing normal, or non-autonomous vehicle. In particular, as autonomous driving becomes possible, the interior space of the autonomous vehicle is likely to undergo significant changes due to the fact that a driver no longer will be required to face forward in order to carry out driving responsibilities.

In a conventional seat, a driver can make only a passive movement such as a vertical movement of the seat in a fixed posture while facing a front of a vehicle. However, as autonomous driving becomes possible, a driver is free from driving and accordingly, may move a seat actively to take a posture of viewing a rear or side of the vehicle.

However, when the direction of a seat is changed considerably, a passenger may not be protected by existing airbags. That is, airbags are designed assuming the seat is oriented facing the front of the vehicle, and accordingly, when the seat turns or moves in directions other than the front, the existing airbag alone cannot efficiently protect a passenger from an accident.

Accordingly, even in an autonomous vehicle, there is required implementation of technology by which an airbag is integrated with a seat so as to efficiently protect a passenger.

The foregoing is intended merely to aid in the understanding of the background of the present disclosure, and is not intended to mean that the present disclosure falls within the purview of the related art that is already known to those skilled in the art.

SUMMARY

Accordingly, the present disclosure proposes a seat airbag for a vehicle, the seat airbag configured to be applied to an autonomous vehicle and to respond to various angles of a seat and various angles of collision, thereby efficiently protecting a passenger.

In order to achieve the above object, according to one aspect of the present disclosure, there is provided a seat airbag for a vehicle, the seat airbag including: a cushion including: a main part provided along an edge of a seatback of a vehicle, the main part spreading to a front part of the seatback so as to cover a passenger when spreading and open on a front part of the main part while covering opposite side parts and an upper part of the passenger; and an extension part connected to an open front end of the main part and shrinking so as to protect a front part of the passenger; and a protection tether connected to the extension part and shrinking the extension part by pulling the extension part during spreading of the main part.

The cushion may spread forward from opposite side end edges and an upper end edge of the seatback so as to cover the opposite side parts and the upper part of the passenger.

The shrunk extension part is arranged so as not to expose a front part of a face of the passenger to an outside.

The extension part may include an open part provided to be open on a front part thereof, wherein the open part may be shrunk by the protection tether.

A first end of the protection tether may be connected to a first side of the seatback and a second end of the protection tether may be connected to a second side of the seatback, and an extended part provided between the first end and the second end may be connected to the open part of the extension part, whereby during the spreading of the main part, the protection tether may be pulled by a pulling device, so that the open part of the extension part of the cushion may be pulled by the extended part so as to be shrunk.

The pulling device may include a pair of pulling devices provided respectively on opposite sides of the seatback, each of the pulling devices being connected to the first end and the second end of the protection tether.

A first side of the protection tether may be connected to a front end part of the cushion, and a second side of the protection tether may be connected to the open part of the extension part, wherein during spreading of the cushion, the first side of the protection tether may be pulled forward by the cushion and the second side of the protection tether may be pulled, so that the open part may be pulled and shrunk.

An upper front part of the main part may be connected to the seatback by an upper tether, wherein forward displacement of the main part may be restricted by the upper tether.

In a head-on collision mode or an oblique collision mode relative to a viewing direction of the passenger, the upper tether may be extended or severed at a time when the passenger is loaded on the cushion.

In a side collision mode relative to a viewing direction of the passenger, a length of the upper tether may be maintained even at a time when the passenger is loaded on the cushion.

Each of front parts of a left-side part and a right-side part of the main part may be connected to the seatback by a left side tether and a right side tether, and forward displacement of the main part may be restricted by the left side tether and the right side tether.

In a head-on collision mode or an oblique collision mode relative to a viewing direction of the passenger, the left side tether and the right side tether may be extended or severed at a time when the passenger is loaded on the cushion.

In a right oblique collision mode relative to a viewing direction of the passenger, the left side tether may be extended more than the right side tether at a time when the passenger is loaded on the cushion.

In a left oblique collision mode relative to a viewing direction of the passenger, the right side tether may be extended more than the left side tether at a time when the passenger is loaded on the cushion.

In a side collision mode relative to a viewing direction of the passenger, lengths of the left side tether and the right side tether may be maintained even at a time when the passenger is loaded on the cushion.

The seat airbag for a vehicle of the present disclosure is configured to be applied to an autonomous vehicle and to respond to various angles of a seat and various angles of collision, thereby efficiently protecting a passenger.

BRIEF DESCRIPTION OF THE DRAWINGS

The above and other objects, features and other advantages of the present disclosure will be more clearly understood from the following detailed description when taken in conjunction with the accompanying drawings, in which.

DETAILED DESCRIPTION OF THE DISCLOSURE

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles. The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising" when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Figure 5:
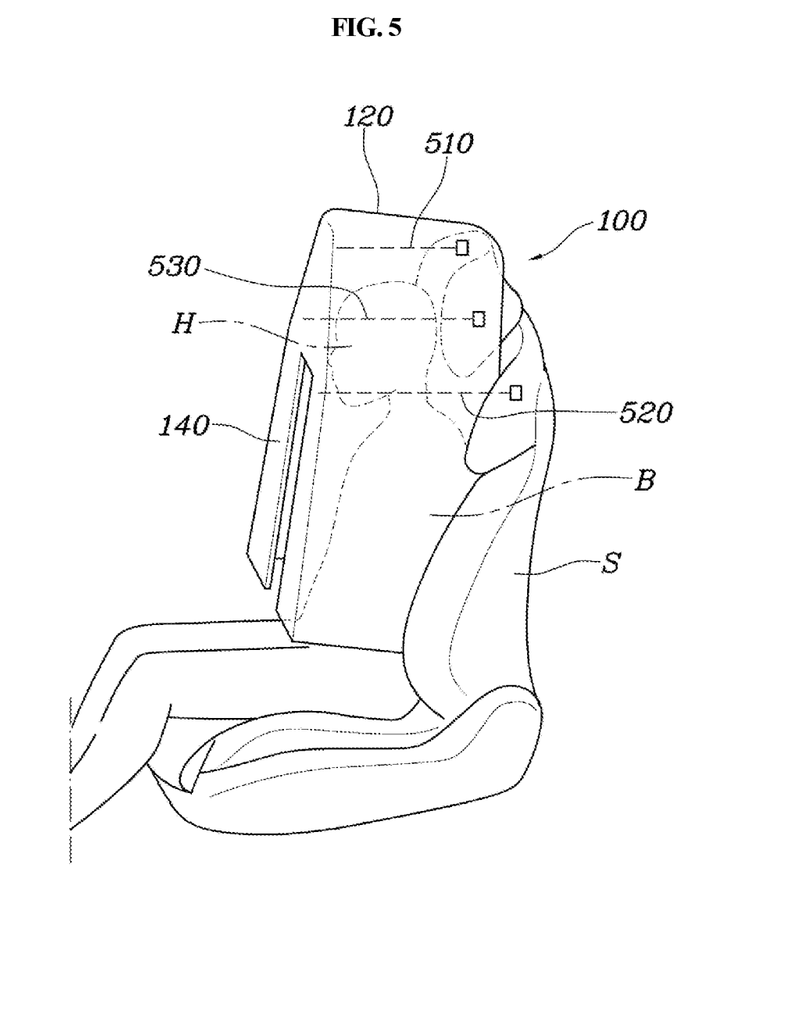
FIG. 5 is a perspective view showing tethers of protecting a passenger of the seat airbag for a vehicle according to the embodiment of the present disclosure.
Figure 6:
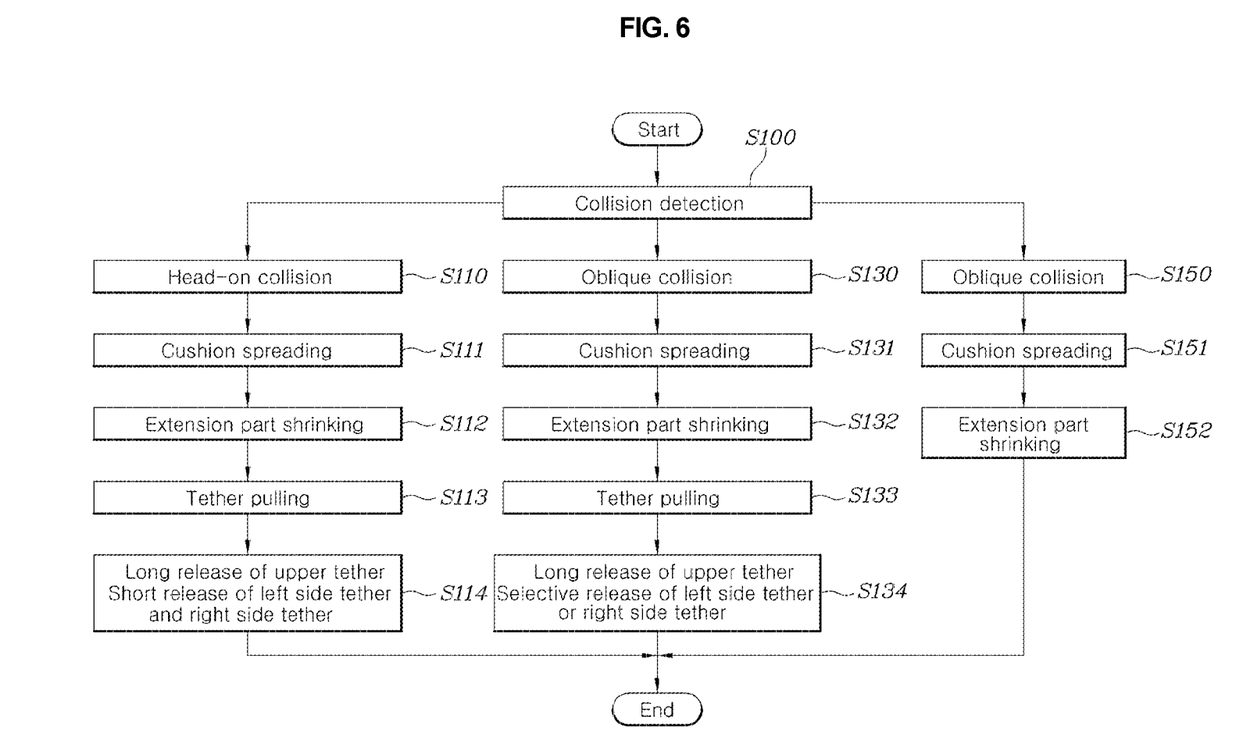
FIG. 6 is a flowchart showing a spreading order of the seat airbag for a vehicle according to the embodiment of the present disclosure.

FIGS. 1 to 4 are perspective views showing a spreading process of a seat airbag for a vehicle according to an embodiment of the present disclosure; FIG. 5 is a perspective view showing tethers of protecting a passenger of the seat airbag for a vehicle according to the embodiment of the present disclosure; and FIG. 6 is a flowchart showing the spreading order of the seat airbag for a vehicle according to the embodiment of the present disclosure.

FIGS. 1 to 4 are perspective views showing the spreading process of the seat airbag for a vehicle according to the embodiment of the present disclosure. The seat airbag for a vehicle according to the present disclosure includes: a cushion 100 having: a main part 120 provided along an edge of a seatback S of a vehicle, the main part spreading to a front part of the seatback so as to cover a passenger B when spreading and open on a front part of the main part while covering opposite side parts and an upper part of the passenger B; and an extension part 140 connected to an open front end of the main part 120 and shrinking so as to protect a front part of the passenger B; and a protection tether 300 connected to the extension part 140 and shrinking the extension part 140 by pulling the extension part 140 during spreading of the main part 120.

That is, the present disclosure is applied to an autonomous vehicle and an existing normal (i.e., non-autonomous) vehicle and includes an airbag provided on a seat. Accordingly, although a direction of the seat in the autonomous vehicle may be changed by turning of the seat, a passenger is protected from an accident, and even in the normal vehicle, a passenger on a seat is protected from an accident, whereby improved and efficient protection of a passenger can be achieved.

Particularly, according to the present disclosure, as shown in the drawings, to protect a passenger on the seat, the cushion is spread from the edge of the seatback and covers the passenger sitting on the seat. Accordingly, even during a collision, the passenger stays only in a protection area between the airbag and the passenger while sitting on the seat, and is covered by the airbag such that impact is effectively absorbed by the airbag. Since such a technology is provided to cover a passenger not just in a normal collision of a vehicle, but also in a rollover, so that the passenger is efficiently protected.

Figure 1:
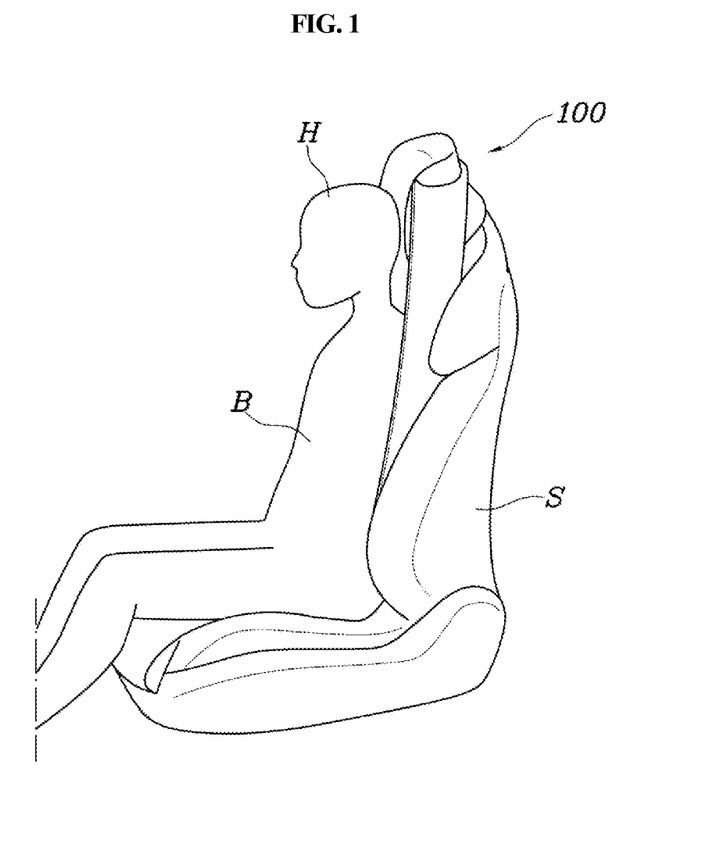
FIGS. 1 to 4 are perspective views showing a spreading process of a seat airbag for a vehicle according to an embodiment of the present disclosure.
Figure 2:
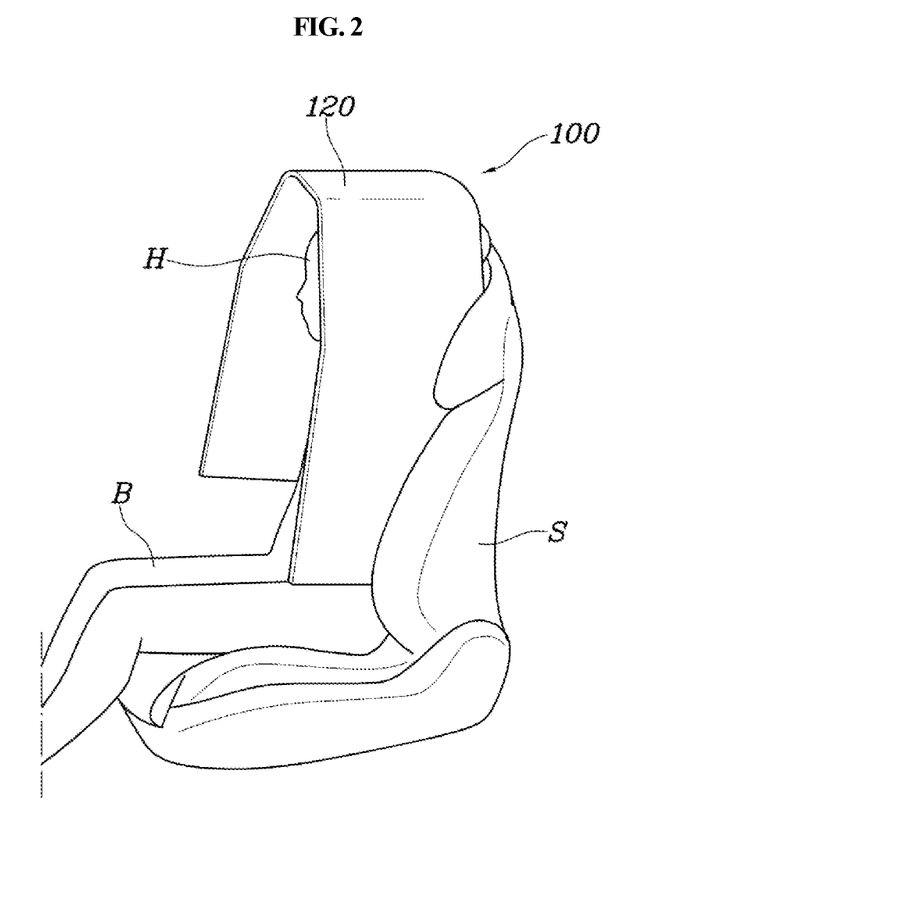

Meanwhile, to this end, the cushion of the present disclosure may include the main part 120 and the extension part 140. The main part 120 is provided along the edge of the seatback S of the vehicle. When the cushion includes a headrest, the main part 120 is provided along an edge of the headrest or an edge of the seatback positioned behind the headrest. In addition, the main part 120 spreads forward so as to cover the passenger B when the main part 120 is spread by collision detection. The main part 120 may be spread in a gas charging method by an inflator mounted on an inner part of the seatback. The process is shown in FIGS. 1 and 2. Accordingly, the main part 120 spreads to be open on the front part thereof while covering the opposite side parts and the upper part of the passenger B.

Figure 3:
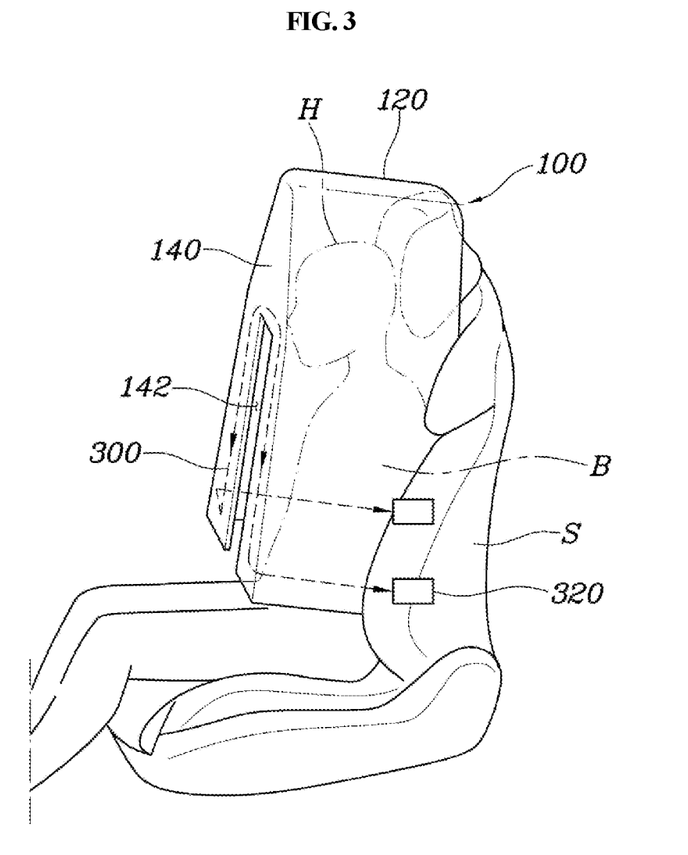

Further, as shown in FIG. 3, the extension part 140 is an additional chamber extending from the open front end of the main part 120 and shrinks so as to protect the front part of the passenger. That is, the extension part 140 refers to a part extending further forward from the main part 120 and is integrated with the main part 120 so as to have a chamber. As for the configuration of the extension part 140, although the main part 120 extends only forward, the extension part 140 may cover some of an open part of the main part 140 so as to receive a head H of the passenger B and a front part of a chest thereof.

In addition, when the extension part 140 is spread initially in a state of being shrunk, the extension part 140 may be stopped by the head H of the passenger and not spread properly while spreading since the airbag starts spreading from a rear of the passenger. Accordingly, the extension part 140, which is not shrunk initially, is positioned on the front part of the main part 120 and starts expanding at a time when the spreading of the main part 120 proceeds to some degree. The extension part 140 spread at a state of full spread of the main part 120 is shrunk, and accordingly, during the spreading of the airbag, the air bag is not interfered with by the passenger. Preferably, the air bag effectively covers the front part of the passenger in the state of full spread thereof.

To this end, the protection tether 300 is provided. The protection tether 300, which is connected to the extension part 140, pulls the extension part 140 during the spreading of the main part 120 so as to shrink the extension part 140. Although various embodiments of the protection tether 300 are possible, the exemplary embodiment thereof may be shown in FIGS. 3 and 4.

Particularly, in FIG. 3, an additional actuator is used so as to operate the protection tether 300, and the extension part 140 may include the open part 142 provided to be open on the front part thereof, wherein the open part 142 may be shrunk by the protection tether 300. Here, a first end of the protection tether may be connected to a first side of the seatback S, a second end of the protection tether 300 may be connected to a second side of the seatback S, and an extended part provided between the first end and the second end may be connected to the open part 142 of the extension part 140, whereby during the spreading of the main part 120, each of the first end and the second end of the protection tether 300 is pulled by a pulling device 320, so that the open part 142 of the extension part 140 of the cushion may be pulled by the extended part so as to be shrunk.

The state of full spread of the main part 120 is required to be detected by a controller. The controller allows the pulling device 320 to operate in a predetermined time after checking the time of starting the spreading of the main part 120. Further, the controller may detect the full spread of the main part 120 via an additional sensor and allows the pulling device 320 to operate. For example, the pulling device 320 may be an electric-powered retractor or a retractor using an additional inflator. That is, after the main part 120 and the extension part 140 are spread fully, the extension part 140 is required to shrink. In this case, the pulling device 320 is operated and the opposite ends of the protection tether 300 are pulled, whereby an entire length of the protection tether 300 decreases, and accordingly, the open part 142 of the extension part 140 shrinks. To this end, the pulling device may include a pair of pulling devices 320 provided respectively on opposite sides of the seatback, wherein each of the pulling devices 320 may be connected to the first end and the second end of the protection tether 300.

Figure 4:
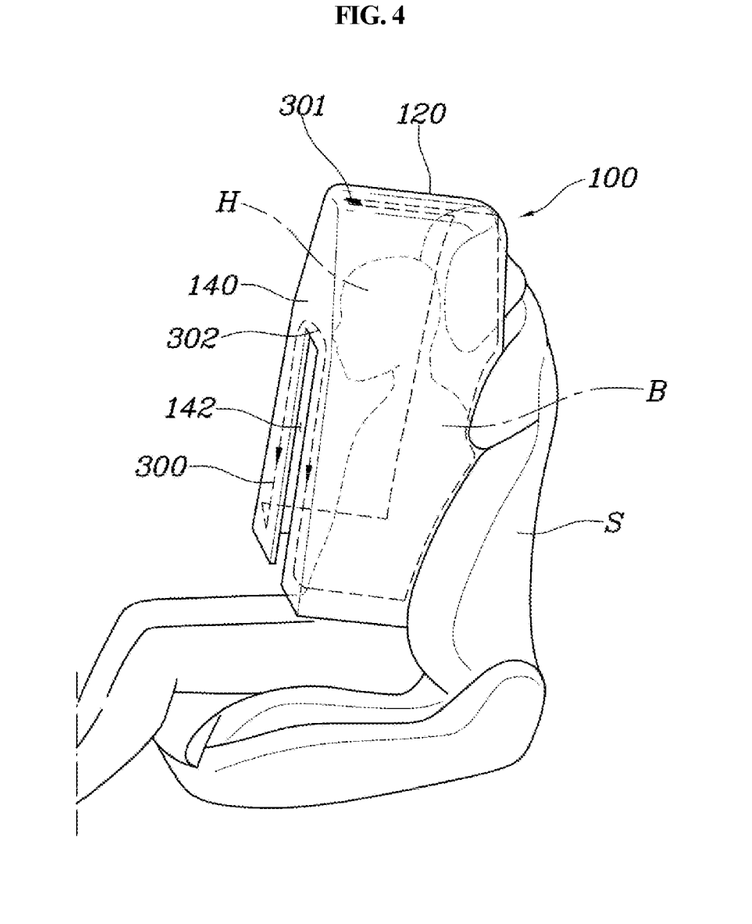

Meanwhile, as shown in FIG. 4 depicting an airbag according to a modification of the embodiment of the present disclosure, a first side of the protection tether 300 may be connected to a front end part of the cushion, and a second side of the protection tether 300 may be connected to the open part 142 of the extension part 140, wherein during spreading of the cushion, the first side of the protection tether 300 is pulled forward by the cushion, and the second side of the protection tether 300 is pulled, so that the open part 142 may be pulled and shrunk.

Particularly, as shown in FIG. 4, when a middle part 301 of the protection tether 300 is fixed to a front end part of the main part 120, the main part 120 pulls the protection tether 300 forward during the full spread of the main part 120. In addition, accordingly, the second side 302 of the protection tether 300 is pulled toward the middle part 301, and the open part 142 of the extension part 140 is shrunk by a length thereof decreased by the second side 302 being pulled. In this case, without the additional actuator, a sensor, or the controller, the extension part 140 may be shrunk.

By using the protection tether 300 in various configurations, the cushion is not interfered with by the passenger during the spreading, and receives the front part of the passenger during the full spread of the main part 120, thereby effectively protecting a passenger.

Meanwhile, as shown in FIG. 5, an upper front part of the main part 120 may be connected to the seatback by an upper tether 510, wherein forward displacement of the main part 120 may be restricted by the upper tether 510. That is, apart from the protection tether, the upper tether 510 efficiently restricts the forward protruding displacement of the main part 120 according to the length of the tether during the full spread of the main part 120.

In addition, in a head-on collision mode or an oblique collision mode relative to a viewing direction of the passenger, the upper tether 510 is extended or severed after being pulled at the time when the passenger is loaded on the cushion, whereby a neck injury of the passenger is prevented. The upper tether 510 restricts the forward displacement of the main part 120 so as to stably maintain a shape of the main part 120 and perform the separation of the main part 120 from the extension part 140.

In addition, during initial loading of a passenger, the extension part 140 functions to efficiently support the head H of the passenger. However, during a collision, the passenger constantly receives inertia in a direction of the collision. Even in this case, when the upper tether 510 strongly holds the main part 120, the head of the passenger is stopped by an upper part of the extension part 140, and accordingly, a secondary injury such as a broken neck of the passenger may result. Accordingly, at a loading time of the passenger after a collision or immediately after the loading time, a tether cutter is used to sever the upper tether 510 or a retractor is released to increase a length of the upper tether 510, which can prevent a neck injury of the passenger and allows the extension part 140 to effectively absorb the impact of the head of the passenger.

In addition, in a side collision mode relative to the viewing direction of the passenger, the length of the upper tether 510 may be maintained even at the time when the passenger is loaded on the cushion. In this case, since inertia of the head of the passenger is not in a forward direction but in a side direction, the length of the upper tether 510 is maintained, whereby the main part 120 is prevented from shaking to the side direction and the passenger is stably supported by the side parts of the main part 120.

Further, each of front parts of a left-side part and a right-side part of the main part 120 may be connected to the seatback S by a left side tether 520 and a right side tether 530, and the forward displacement of the main part 120 may be restricted by the left side tether 520 and the right side tether 530. Additionally, in the head-on collision mode or the oblique collision mode relative to the viewing direction of the passenger, the left side tether 520 and the right side tether

530 may be extended or severed at the time when the passenger is loaded on the cushion.

Particularly, in a right oblique collision mode relative to the viewing direction of the passenger, the left side tether 520 may be extended more than the right side tether 530 at the time when the passenger is loaded on the cushion. Accordingly, although the passenger is moved to the right side by inertia, the left side tether is extended so as to stably support the passenger at the right side and to allow impact of the passenger to be absorbed to the maximum.

On the contrary, in a left oblique collision mode relative to the viewing direction of the passenger, the right side tether 530 may be extended more than the left side tether 520 at the time when the passenger is loaded on the cushion.

In addition, in the side collision mode relative to the viewing direction of the passenger, lengths of the left side tether 520 and the right side tether 530 may be maintained even at the time when the passenger is loaded on the cushion, whereby the passenger may be stably supported without shaking or deviation from the cushion.

FIG. 6 is a flowchart showing the spreading order of the seat airbag for a vehicle according to the embodiment of the present disclosure. During the occurrence of a collision, the controller of the airbag analyzes a vision sensor value or a collision sensor value so as to identify whether there was a head-on collision, an oblique collision, or a side collision, relative to the viewing direction of the passenger at S100. Further, when it is determined that the head-on collision occurred at S110, the cushion is spread by the inflator and after the full spread of the cushion, the extension part is shrunk by the protection tether at S111 and S112. Further, during passenger loading, the upper tether, the right side tether, and the left side tether are pulled by the retractor so as to stably support the main part, and immediately after the loading or in a predetermined time after the loading the upper tether is released to be long so as to prevent a neck injury of the passenger at S113 and S114.

Meanwhile, in the oblique collision, all processes are the same as the processes of the head-on collision except that during the tether release according to the passenger loading, a tether of a side contrary to a slanting direction of the collision is extended longer so as to efficiently protect the passenger at S130 to S134.

In addition, in the side collision, the cushion is spread and the extension part is shrunk, but in this case, the tether release is not performed, whereby the passenger is supported and protected without shaking although the passenger is moved in the side direction so as to prevent the passenger from deviating from the airbag in outer sides direction thereof at S150 to S152.

The seat airbag for a vehicle of the present disclosure, which is applied to the autonomous vehicle, responds to various angles of a seat and various angles of collision, thereby efficiently protecting a passenger.

Although the preferred embodiments of the present disclosure has been described for illustrative purposes, those skilled in the art will appreciate that various modifications, additions and substitutions are possible, without departing from the scope and spirit of the disclosure as disclosed in the accompanying claims.

What is claimed is:

1. A seat airbag for a vehicle, the seat airbag comprising: a cushion including: a main part provided along an edge of a seatback of the vehicle, the main part spreading to a front part of the seatback so as to cover a passenger when spreading and open on a front part of the main part while covering opposite side parts and an upper part of the passenger; and an extension part connected to an open front end of the main part and shrinking so as to protect a front part of the passenger; and a protection tether connected to the extension part and shrinking the extension part by pulling the extension part during spreading of the main part, wherein the extension part includes an open part provided to be open on a front part thereof, wherein the open part is shrunk by the protection tether.

2. The seat airbag of claim 1, wherein the cushion spreads forward from opposite side end edges and an upper end edge of the seatback so as to cover the opposite side parts and the upper part of the passenger.

3. The seat airbag of claim 1, wherein the shrunk extension part is arranged so as not to expose the front part of a face of the passenger to an outside.

4. The seat airbag of claim 1, wherein a first end of the protection tether is connected to a first side of the seatback, a second end of the protection tether is connected to a second side of the seatback, and an extended part provided between the first end and the second end is connected to the open part of the extension part, whereby during the spreading of the main part, the protection tether is pulled by a pulling device, so that the open part of the extension part of the cushion is pulled by the extended part so as to be shrunk.

5. The seat airbag of claim 4, wherein the pulling device includes a pair of pulling devices provided respectively on opposite sides of the seatback, each of the pulling devices being connected to the first end and the second end of the protection tether.

6. The seat airbag of claim 1, wherein a first side of the protection tether is connected to a front end part of the cushion, and a second side of the protection tether is connected to the open part of the extension part, wherein during spreading of the cushion, the first side of the protection tether is pulled forward by the cushion and the second side of the protection tether is pulled, so that the open part is pulled and shrunk.

7. The seat airbag of claim 1, wherein an upper front part of the main part is connected to the seatback by an upper tether, wherein forward displacement of the main part is restricted by the upper tether.

8. The seat airbag of claim 7, wherein in a head-on collision mode or an oblique collision mode relative to a viewing direction of the passenger, the upper tether is extended or severed at a time when the passenger is loaded on the cushion.

9. The seat airbag of claim 7, wherein in a side collision mode relative to a viewing direction of the passenger, a length of the upper tether is maintained even at a time when the passenger is loaded on the cushion.

10. The seat airbag of claim 1, wherein each of front parts of a left-side part and a right-side part of the main part is connected to the seatback by a left side tether and a right side tether, and forward displacement of the main part is restricted by the left side tether and the right side tether.

11. The seat airbag of claim 10, wherein in a head-on collision mode or an oblique collision mode relative to a viewing direction of the passenger, the left side tether and the right side tether are extended or severed at a time when the passenger is loaded on the cushion.

12. The seat airbag of claim 10, wherein in a right oblique collision mode relative to a viewing direction of the passenger, the left side tether is extended more than the right side tether at a time when the passenger is loaded on the cushion.

13. The seat airbag of claim 10, wherein in a left oblique collision mode relative to a viewing direction of the passenger, the right side tether is extended more than the left side tether at a time when the passenger is loaded on the cushion.

14. The seat airbag of claim 10, wherein in a side collision mode relative to a viewing direction of the passenger, lengths of the left side tether and the right side tether are maintained even at a time when the passenger is loaded on the cushion.

\* \* \* \* \*